United States Patent
Donze et al.

(10) Patent No.: US 6,712,911 B2
(45) Date of Patent: Mar. 30, 2004

(54) FLAME-CUTTING OF COLD OR HOT SLABS USING ONE OR MORE OXYCUTTING TORCHES

(75) Inventors: Valérie Donze, Laxou (FR); Bertrand Donze, Dugny (FR); Pascal Donze, Nancy (FR); Thierry Rozot, Thorey Lyautey (FR)

(73) Assignee: Eon Holding S.A. (LU)

(*) Notice: Subject to any disclaimer, the term of this patent is extended or adjusted under 35 U.S.C. 154(b) by 0 days.

(21) Appl. No.: 10/136,577

(22) Filed: Apr. 24, 2002

(65) Prior Publication Data

US 2002/0158375 A1 Oct. 31, 2002

(51) Int. Cl.$^7$ ............................... B23K 37/00
(52) U.S. Cl. ..................... 148/196; 266/48; 266/61
(58) Field of Search ................ 266/48, 62, 61; 148/196, 194

(56) References Cited

U.S. PATENT DOCUMENTS

| | | | |
|---|---|---|---|
| 3,862,749 A | * | 1/1975 | Fieser et al. ............. 148/194 |
| 4,175,729 A | | 11/1979 | Karlsson |
| 4,315,618 A | | 2/1982 | Pawlowski |
| 4,809,956 A | * | 3/1989 | Donze ......................... 266/48 |
| 4,923,527 A | | 5/1990 | Ludwigson |
| 5,198,178 A | | 3/1993 | Lotz et al. |
| 6,534,739 B2 | * | 3/2003 | Donze et al. .......... 219/121.39 |

FOREIGN PATENT DOCUMENTS

| | | |
|---|---|---|
| EP | 0827920 | 3/1998 |
| EP | 0893372 | 1/1999 |
| FR | 2746686 | 10/1997 |

OTHER PUBLICATIONS

Search Report for corresponding Patent Application No. 00202767.0–2302—Date: Dec. 29, 2000.

* cited by examiner

Primary Examiner—Scott Kastler
(74) Attorney, Agent, or Firm—Polster, Lieder, Woodruff & Lucchesi

(57) ABSTRACT

The invention concerns a procedure for flame-cutting a slab using at least one oxycutting torch at a workstation and a device for implementing this procedure. The slab and the oxycutting torch are moved in relation to each other, with the slab arranged in a cutting position such that its primary plane lies at an angle of −10° to −20° with respect to the vertical plane.

18 Claims, 6 Drawing Sheets

US 6,712,911 B2

FLAME-CUTTING OF COLD OR HOT SLABS USING ONE OR MORE OXYCUTTING TORCHES

CROSS-REFERENCE TO RELATED APPLICATIONS

This application claims priority to European Application No. 01201540.0 filed Apr. 26, 2001.

STATEMENT REGARDING FEDERALLY SPONSORED RESEARCH OR DEVELOPMENT

Not Applicable.

BACKGROUND OF THE INVENTION

The invention involves a procedure for flame-cutting a parallelepiped slab using one or several oxycutting torches and a device for implementing this procedure.

Various oxycutting procedures are known to the trade, including, for example, the procedure described in the French Patent Application Number 2,746,686. In this procedure, the slab is placed edgewise on a series of feed rollers that carry it forward past an oxycutting torch between pairs of loose-mounted vertical rollers.

European Patent Application Number 00202767.0 dated Aug. 4, 2000, describes a procedure for flame-cutting slabs and a device for implementing this procedure. The slabs are slit or cut while lying horizontally or on edge and suspended by means of electromagnets located below the feed rollers.

These procedures and systems present certain drawbacks, such as the treatment of slabs having extreme dimensions (affecting stability when placed on edge) or slabs at high temperatures.

BRIEF SUMMARY OF THE INVENTION

The purpose of the invention is to provide a procedure for flame-cutting slabs and a device for implementing this procedure that do not present these drawbacks.

According to the invention, this objective is met by means of a procedure for flame-cutting a slab using at least one oxycutting torch at a workstation, including a step in which the slab and the oxycutting torch are moved in relation to each other with the slab lying in a cutting position in such a way that its primary plane lies at an angle of −10° to −20° from the vertical plane.

For continuous operation, two workstations are envisioned on the line. At each workstation, the slab is in a cutting position and arranged in such a way that its primary plane lies at an angle of −10° to −20° with respect to the vertical plane. Each of the workstations is used for loading, flame-cutting and unloading a slab to be cut, and the two workstations are each used to flame-cut slabs in alternating order. Therefore, one of the workstations can be used to load the slab and the other can be used to unload the cut slab. An additional workstation can be included on the line between these two workstations in order to flame-cut the slab in its position at −10° to −20° from the vertical plane. The slab to be cut is loaded onto the loading workstation and carried from there to the aforementioned additional workstation, where it is subjected to the oxycutting procedure, and then moved to the unloading workstation where the cut slab is unloaded.

The slab can be slit or cut during oxycutting as the slab and the oxycutting torch are moved relative to each other.

The slabs can be loaded continuously in order to be carried past the oxycutting torch and then slit or cut depending on the direction of each slab's movement with respect to the oxycutting torch.

According to the invention, the device for implementing the procedure incorporates at least one oxycutting torch for flame-cutting a slab by moving the slab and the oxycutting torch relative to each other, and a mechanism or frame for holding a slab to be cut such that the slab's primary plane lies at an angle of −10° to −20° with respect to the vertical plane.

The aforementioned mechanism for holding a slab may include rollers placed in bracketed pairs so as to receive and hold the slab to be cut on its edge at an angle of −10° to 20° and to form an oblique base plane.

At least one pair of guides, capable of moving in unison along and atop this mechanism's oblique base plane in order to hold a slab, can be included for the purpose of holding an oxycutting torch and its associated deburring device. The at least one pair of guides is placed in a desired cutting location along the lengthwise extension of a slab held by the mechanism, in order to hold the slab in place so that it can be flame-cut at the aforementioned desired cutting location.

For continuous oxycutting of slabs, the production line can also include a second workstation having mechanism or frame for holding a slab so that its primary plane forms this same angle of −10° to −20° with respect to the vertical plane; this second workstation mechanism for holding a slab also includes rollers placed in bracketed pairs so as to receive and hold the slab to be cut on its edge at an angle of −10° to −20° and to form a second oblique base plane. The aforementioned pair(s) of guides, which are capable of moving in unison along and atop the mechanism's oblique base plane in order to hold a slab for the purpose of receiving one of the aforementioned oxycutting torch(es) and the deburring device(es) associated with the oxycutting torch(es) in a desired cutting position along the lengthwise extension of a slab held by this mechanism so that it can be flame-cut at the aforementioned desired cutting location, can be moved so as to be mounted on the second oblique base plane for the purpose of flame-cutting a slab loaded onto this second workstation mechanism, so that the slab can be held in place at the desired cutting location.

A third workstation can be placed on the line between the two workstations used to hold a slab. This additional workstation includes a series of rollers placed in bracketed pairs so as to receive a slab on its edge at an angle of −10° to −20° with respect to the vertical plane on a third oblique base plane formed by the series of rollers placed in bracketed pairs. The pair of guides can be moved in unison along and atop the aforementioned third oblique base plane. The rollers in the aforementioned pairs of rollers that receive the slab on its edge can be motorized so as to carry the slab from the first workstation for holding a slab to the third, oxycutting workstation and then to the second workstation mechanism for holding a slab, where the cut slab is unloaded.

These mechanisms or frames for holding a slab can be tipped in such a way that their oblique base plane is in a horizontal position, for the purpose of loading a slab or unloading a cut slab, respectively.

In an alternate embodiment of the invention, a device for flame-cutting slabs by means of at least one oxycutting torch can also include a feed area; an oxycutting area equipped with the aforementioned oxycutting torch(es) and an associated deburring device placed opposite to each cutting torch, with the slab lying in this oxycutting area with its primary plane in horizontal position between the aforementioned cutting torch(es) and the deburring device for each cutting torch; and a slab unloading area. The device could include mechanisms for transporting the slab from the feed area to the oxycutting area and then to the unloading area, and the oxycutting torch can be moved along a line that is perpendicular to the slab's lengthwise extension, from one lengthwise edge of the slab to the opposite lengthwise edge, so that the slabs can be cut. Moreover, the oxycutting torch can be stopped at any point along this perpendicular line so that a slab to be flame-cut can be slit during the oxycutting procedure as it is moved in the direction of its lengthwise extension.

The feed area and/or the unloading area may include an elevating table that can be adjusted so that its base plane is even with the oxycutting area.

The oxycutting area can be made up of an adequate number of base rollers whose axis is perpendicular to the direction in which the slabs move from the feed area to the unloading area, so that they form a base plane. The aforementioned cutting torch(es) and the deburring device associated with the cutting torch(es) are arranged in the space between two neighboring base rollers and on either side of the base plane formed by the base rollers.

The mechanisms to be used to transport the slabs may include equipment to push the slabs in the feed area as well as motorized base rollers.

The device may include additional motorized base rollers on either side of the oxycutting area in order to form a set of transfer rollers, and the feed area and unloading area may be arranged laterally to this set of transfer rollers, while equipment for pushing the cut or slit slabs can be included in the unloading area.

BRIEF DESCRIPTION OF THE SEVERAL VIEWS OF THE DRAWINGS

The invention will now be described by way of non-restrictive examples with reference to the attached drawings, in which.

Corresponding reference numerals will be used throughout the several figures of the drawings.

DETAILED DESCRIPTION OF THE INVENTION

Figure 1:
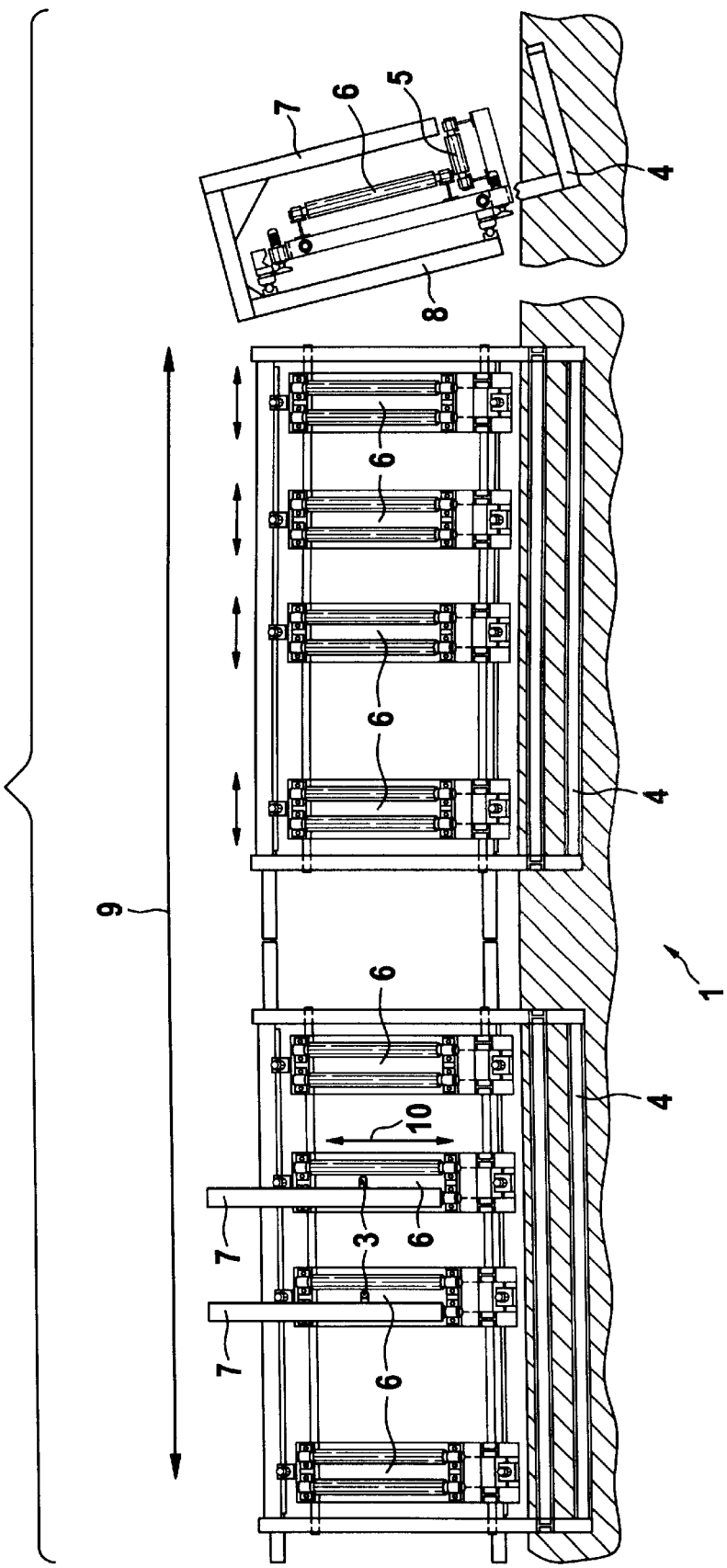
FIG. 1 is a front view and side view of one embodiment of the invention, comprising two workstations that can be used in alternating order to flame-cut slabs using an oxycutting torch/deburrer assembly that can be moved from one workstation to the other and vice versa.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
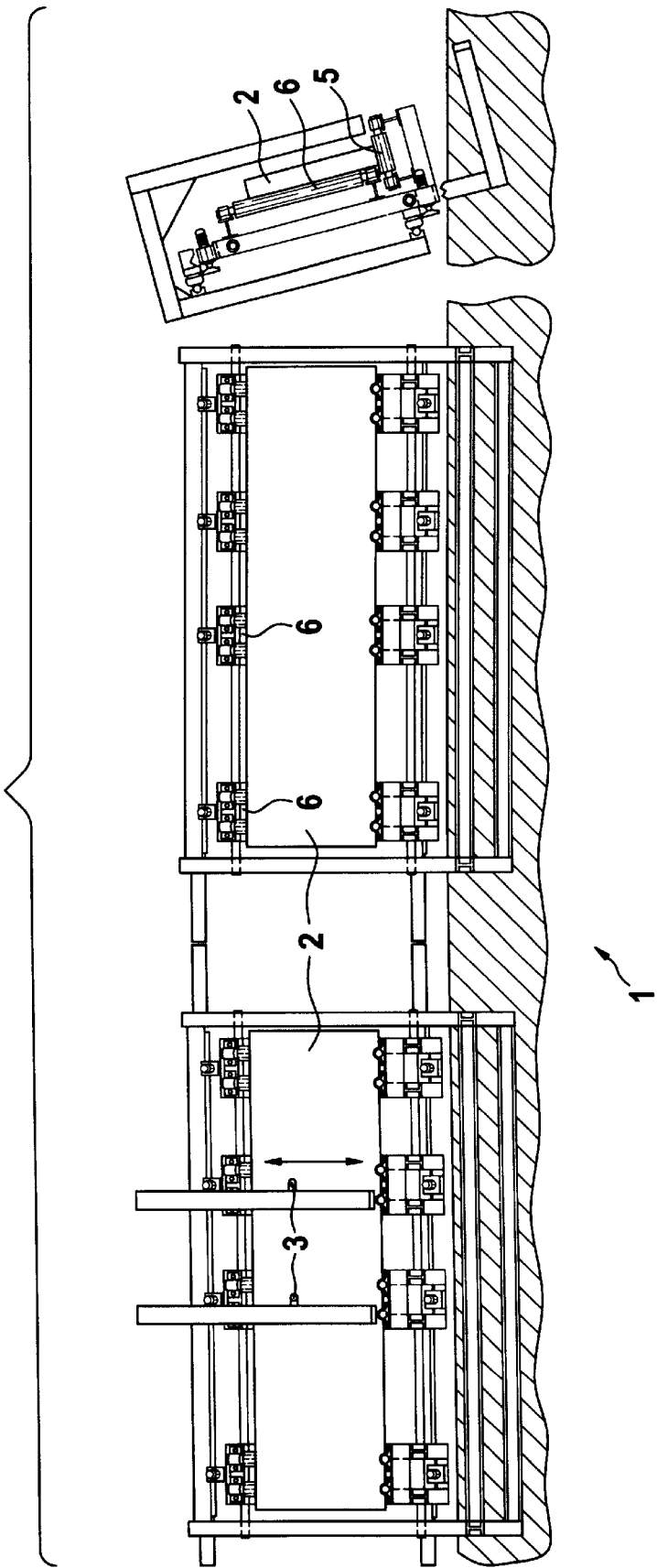
FIG. 2 depicts the embodiment of the invention shown in FIG. 1, with each of the workstations loaded with a slab to be cut, and the oxycutting torch/deburrer assembly in operation at the left workstation.
Figure 3:
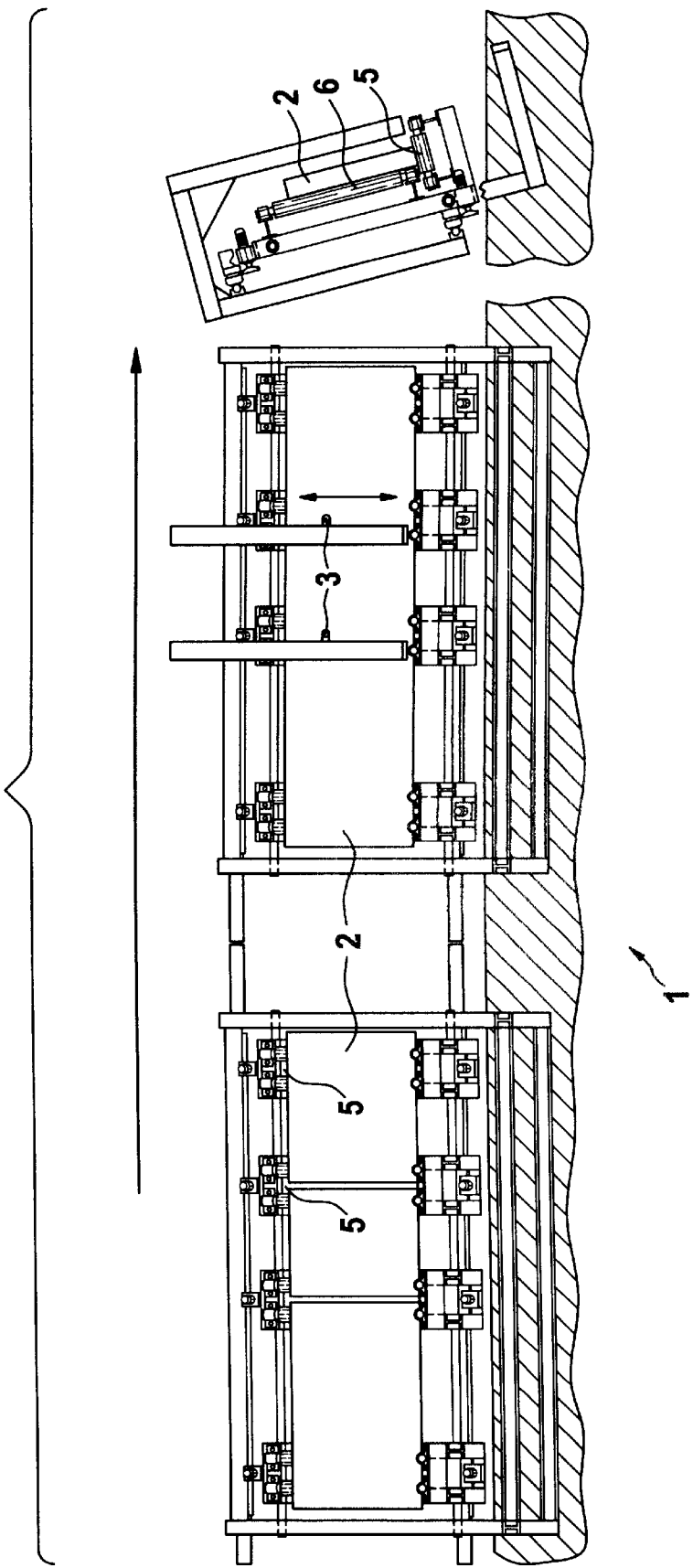
FIG. 3 depicts the embodiment of the invention shown in FIG. 1, at the point when the slab at the left workstation has been cut and is ready for unloading, while the oxycutting torch/deburrer assembly is in operation at the right workstation.

FIGS. 1 through 3 depict a device 1 with two workstations for flame-cutting slabs 2, using at least one oxycutting torch 3 in accordance with the invention, in front view and side view in various states of operation: at rest without a slab; in operation for the purpose of flame-cutting a slab on the left workstation, while the right workstation has already been loaded with another slab 2 to be cut; and in operation for the purpose of flame-cutting a slab on the right workstation, while a slab 2 that has been cut at the left workstation is ready to be removed.

Each workstation includes a base frame 4 that can be adjusted between a horizontal position (not shown) and an inclined position that is offset from the vertical by an angle of −10° to −20° and preferably −15°, as shown in FIGS. 1 through 3.

The base frame 4 includes several pairs of bracket-mounted rollers 5, 6 used to insert a slab 2 edgewise on the rollers 5, which support an edge of the slab 2, as seen in FIG. 2. The rollers 6 form an oblique base plane for a slab 2 to be cut and support a face of the slab 2, as seen in FIG. 2. The pairs of rollers 5, 6 at each workstation can each be moved along the lengthwise extension of the relevant base frame 4 by using appropriate methods familiar to those in the trade. Each pair of rollers 5, 6 can thereby be placed at the appropriate location where they will not interfere with the operation of the oxycutting torch 3 as it cuts the slab 2 lying edgewise on the rollers 5 and on the rollers 6 that form the oblique base plane.

At least one pair of guides 7, 8 are mounted by appropriate means atop the base frame 4 so that, at each workstation for flame-cutting slabs, the guides can be moved along the extension of the base frame (4) in the direction of the double arrow (9). The guides 7, 8 accommodate the aforementioned oxycutting torch(es) 3 and the deburring device (not shown) for each cutting torch. The oxycutting torch 3 and its associated deburring device are positioned so that they face each other on either side of the rollers 6; and, during operation, the slab 2 to be cut is between them.

The oxycutting torch 2 and its related deburring device can be moved along the length of their respective guide 7, 8 in the direction indicated by the double arrow 10. When in use on a slab 2 to be cut, the cutting torch cuts across the slab 2 at its lengthwise extension, and the slab 2 is cut.

The slabs are cut as follows: One of the base frames 4 is placed in horizontal position. A slab 2 to be cut is loaded onto the rollers 6 using an appropriate handling mechanism, such as a lifting or pushing mechanism, until it touches the rollers 5. The base frame 4 is tipped into the cutting position at an angle of −10° to −20°, preferably −15°, from the vertical. As seen in FIGS. 1–3, when the base frame 4 is in the cutting position, the roller 5 is a lower roller. The oxycutting torch 3 is moved along the frame's lengthwise extension to the place on the slab 2 where it is to be cut. The oxycutting torch 3 and its associated deburring device must then be moved to the empty space between two pairs of rollers 5, 6. Otherwise, the pair(s) of rollers 5, 6 that are interfering with the operation of the cutting torch 3 must be adjusted along the base frame 4 so that they no longer interfere with the oxycutting process. The oxycutting torch 3 and its deburring device are moved along the guides 7, 8 to the upper or lower edge of the slab 2 and the oxycutting process begins. Then the cutting torch 3 and its deburring device are moved in the direction of the double arrow 10 toward the opposite lower or upper edge of the slab 2, and the oxycutting process is completed when the opposite edge is reached.

While this slab 2 is being cut, another slab 2 can be loaded onto the second workstation in accordance with the procedure described above. Once the oxycutting of the first slab 2 is complete, the guides 7, 8 are moved along with the oxycutting torch 3 and the deburring device to the other workstation, where the base frame is offset from the vertical at an angle identical to that of the base frame 4 on the first workstation where the oxycutting process has just been completed. The guides 7, 8 can then be moved onto the base frame 4 at the second workstation at the spot where the loaded slab 2 must be cut, and the same control, adjustment and cutting operations described above are repeated on the slab 2 that was loaded onto this second workstation.

Meanwhile, the base frame 4 on the first workstation has been lowered into horizontal position and the cut slab 2 has been removed by the aforementioned handling mechanism. Another slab 2 to be cut is loaded onto the base frame 4. The oxycutting device 1 described above can be used to cut the slabs 2 in a continuous process. If a noncontinuous process is sufficient, it is possible to have only one workstation with an area where the pair(s) of guides 7, 8 can be placed out of the way while the slabs 2 are loaded onto and unloaded from the single base frame 4.

If needed (for example, if the user wishes to cut a slab in more than one location), it is possible to have more than one pair of movable guides 7, 8 mounted atop the base frame 4 along with the necessary oxycutting torch(es) 3 and associated deburring devices. Thus, an additional pair of guides 7, 8 is shown in FIGS. 1, 2 and 3.

It is difficult to slit a slab 2 by means of flame-cutting using the device as it has been described above. For this purpose, a third workstation can be included, between and aligned with the workstations described above. The third workstation has a base frame 4 that can be adjusted within an operating range of −10° to −20° from the vertical but cannot necessarily be set to a horizontal position, although it is otherwise identical to the other workstations described above. Such a device is depicted schematically in FIG. 4.

Figure 4:
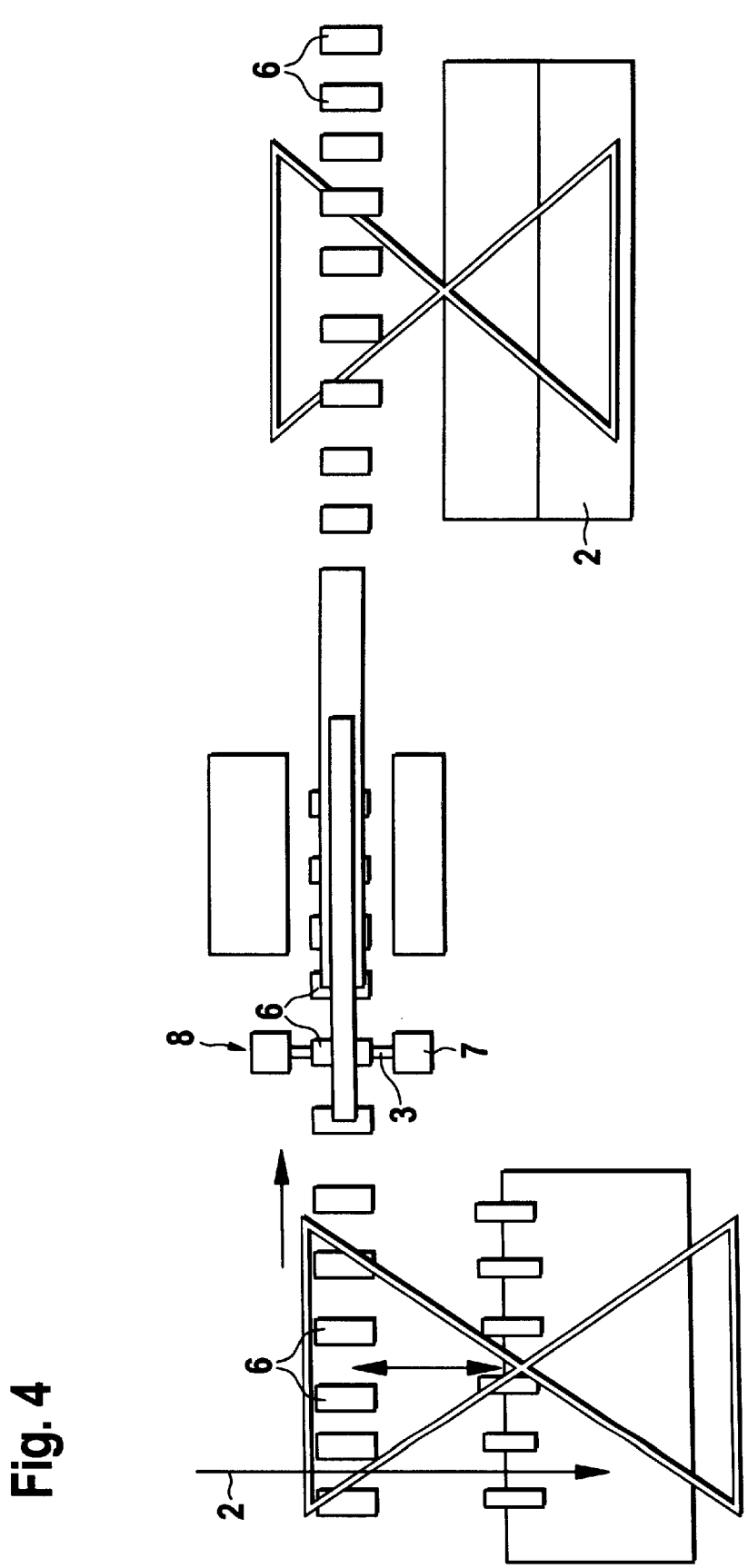
FIG. 4 is a schematic view of the invention shown in FIG. 1 with a workstation inserted between the left and right workstations, and the oxycutting torch/deburrer assembly is in operation at the central workstation.

In the method of producing the invention shown in FIG. 4, the guides 7, 8 together with the oxycutting torch 3 and its associated deburring device can in principle be moved along the base frame 4 at the third workstation, and yet can still be moved to the two other workstations for specific projects. In addition, in this method of producing the invention, the lower rollers 5 or at least a portion of these rollers can be motorized in order to transport the slab 2 to the third workstation to be flame-cut, once it has been loaded onto the workstation being used for loading, and then to transport the slab 2 to the next workstation where the cut slabs are being unloaded. As in the method of producing the invention depicted in FIGS. 1 through 3, the base frames 4 for the workstations on either end can be placed in horizontal position so that a slab 2 can be loaded onto the rollers 6 and a cut slab 2 can be unloaded from the rollers 6.

The number of pairs of guides 7, 8 will depend on the number of slab segments to be created from a single slab 2 to be slit. It is also possible to cut a slab before slitting it. The method of producing the invention shown in the figure can be used either to cut slabs or to slit them or to cut and slit them in a continuous process.

Figure 5:
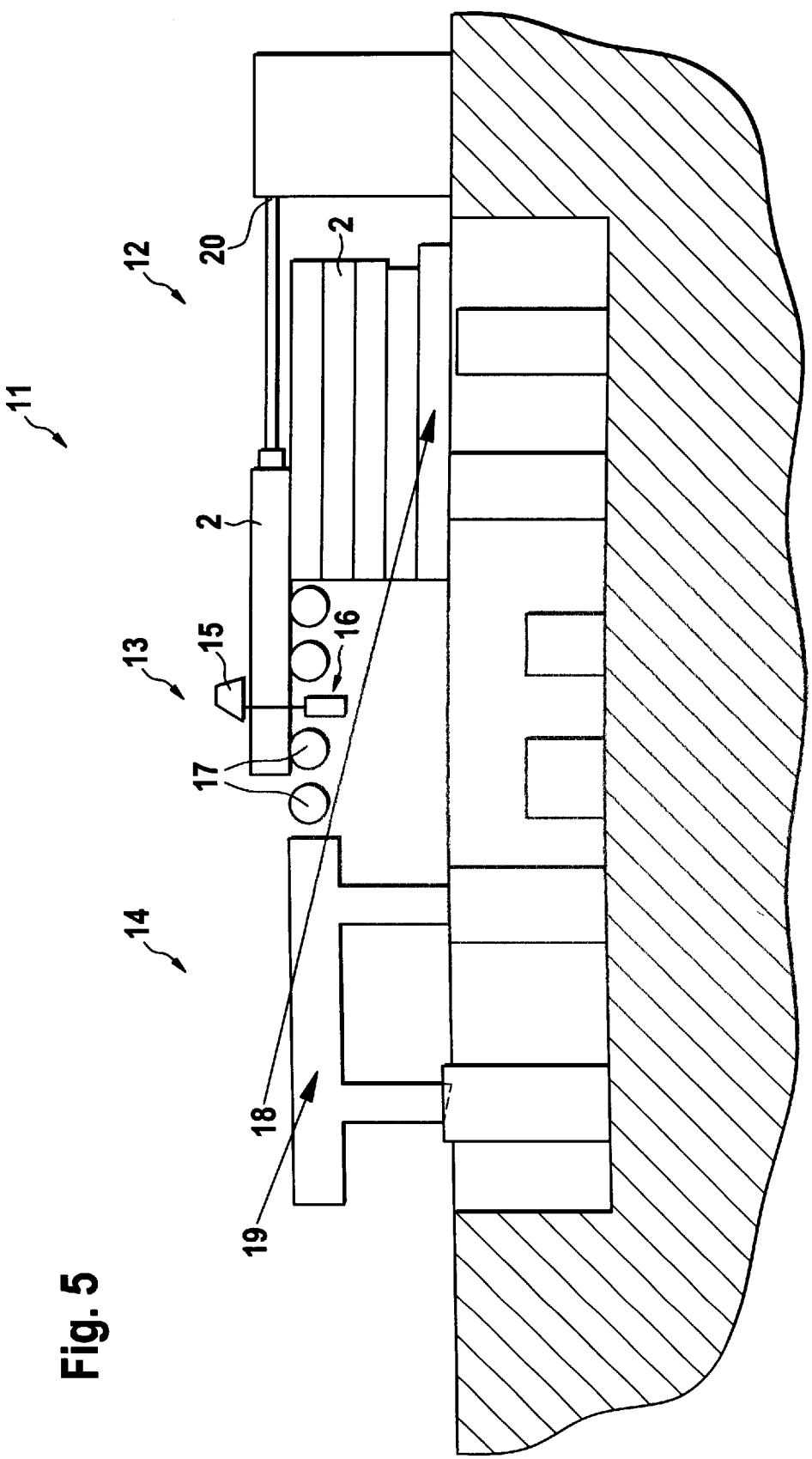
FIG. 5 depicts an alternative embodiment of the invention.
Figure 6:
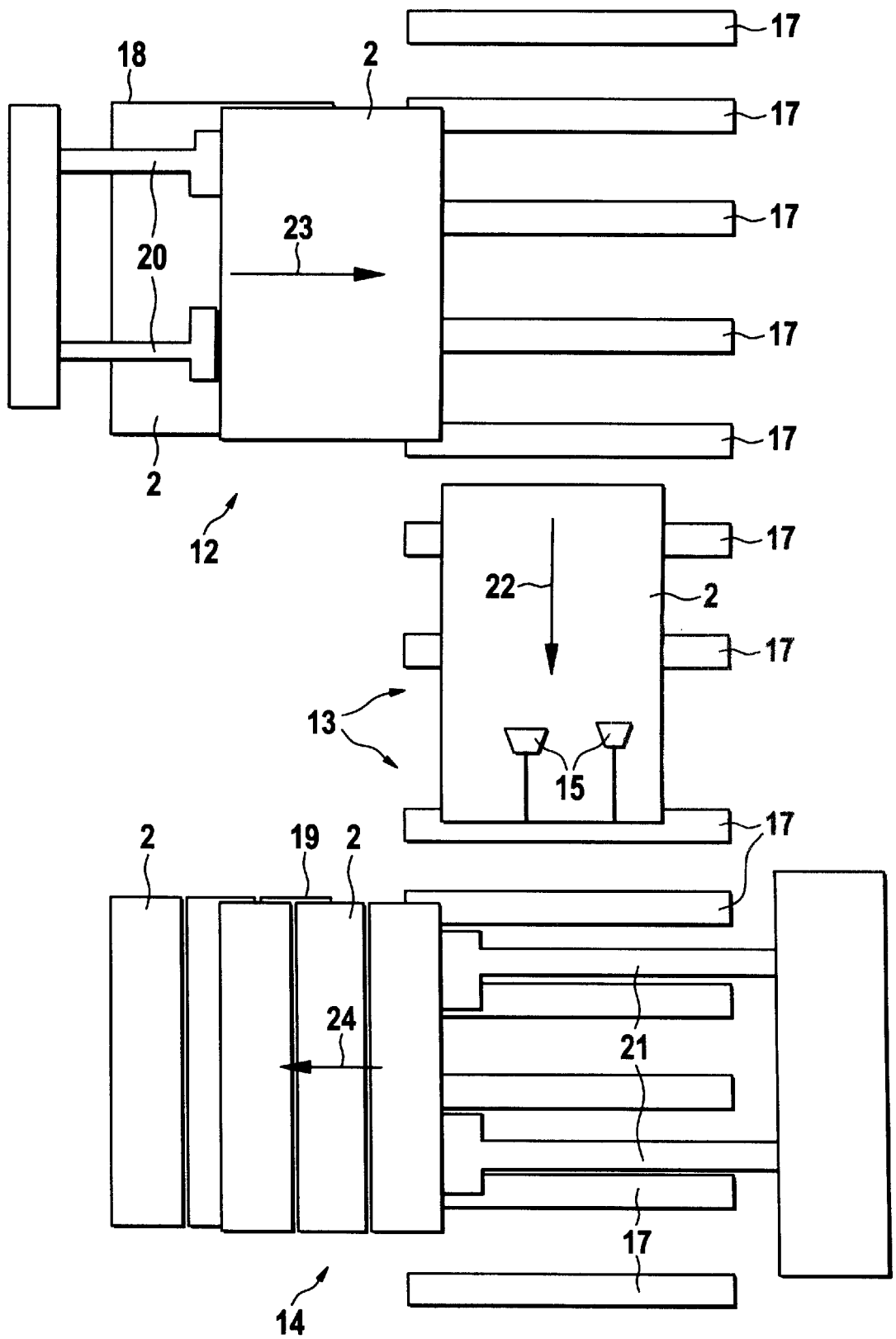
FIG. 6 depicts a variant of the embodiment of the invention shown in FIG. 5.

An alternative device for flame-cutting slabs is shown in FIGS. 5 and 6. The oxycutting device includes a slab loading area 12, a work area 13 where the slabs 2 are flame-cut by means of an oxycutting torch 15 opposite a deburring device 16, and an unloading area 14 for unloading the cut slab 2. During the oxycutting process, the slab 2 moves in a horizontal position between the oxycutting torch 15 and the deburring device 16 on the base rollers 17. The assembly of the cutting torch 15 and the deburring device 16 is located between two base rollers 17 and can be moved in the axial direction of the rollers 17 across the slab 2 from one lengthwise edge to the other lengthwise edge in order to cut the slab 2 at rest during oxycutting, or in order to move the oxycutting torch 2 to a precise location between two lengthwise edges of the slab 2 so that the slab is slit by moving it in a lengthwise direction on the rollers 17 during the oxycutting procedure.

An elevating table 18 or 19, adjustable so that its surface or the upper surface of a slab 2 or stack of slabs is level with the plane formed by the rollers 17, can be incorporated into the loading area as well as the unloading area. A hydraulic or mechanical pushing mechanism 20 is included to push the slab 2, or the top slab on a stack of slabs, on the elevating table 18 into and through the work area. In addition, some of the rollers 17 can be motorized in order to transport the slab into the work area 13 and then from the work area to the unloading area 14 where some other pushing or handling mechanism, not shown, removes the slab or a stack of slabs. The height of the elevating table 19 can be adjusted so that its surface or the upper surface of a slab 2 lying on the table 19 is level with the plane formed by the base rollers 17 and ready to receive the cut or slit slab 2.

FIG. 6 is a schematic depiction of a variant of the device for flame-cutting slabs in accordance with FIG. 5. The set of base rollers 17 is extended on either end of the work area into the loading and unloading areas 12 and 14, and the elevating tables 18, 19 are placed alongside the base rollers 17 in the loading and unloading areas. These tables, or the top surface of the slabs placed on the tables, are level with the base plane formed by the base rollers 17.

Using the variant shown in FIG. 6 of the method of producing the invention depicted in FIG. 5, a slab 2 can be quickly and easily slit, while, in order to cut a slab, the oxycutting torch 15 can be moved across a slab 2 from one lengthwise edge to the other—a movement that is also required in order to adjust the width of each piece of the slit slab.

The slit slab 2 is pushed from the table 18 in the loading area 12 onto the rollers by a pushing mechanism 20 in the direction of the arrow 23. The rollers transport the slab towards and through the work area 13, where, for example, the slab is slit into three pieces of equal or varying width using the oxycutting torch 15. The slab 2 continues to be carried in the direction of the arrow 22 onto the rollers 17 in the unloading area 14, where the pieces of the slit slab are pushed by the pushing mechanism 21 in the direction of the arrow 24 onto the table 19 in the unloading area 14.

As various changes could be made in the above constructions without departing from the scope of the invention, it is intended that all matter contained in the above description or shown in the accompanying drawings shall be interpreted as illustrative and not in a limiting sense.

What is claimed is:

1. An oxycutting procedure for flame-cutting a slab at a workstation having a frame and at least one oxycutting torch adjacent said frame, the procedure including placing the slab on the frame with the frame in a first position; moving the frame to a second, cutting position in which the slab is arranged so that its primary plane lies at an angle of −10° to −20° from the vertical plane; and moving the slab and oxycutting torch in relation to each other with the slab lying in cutting position.

2. The oxycutting procedure in accordance with claim 1, characterized in that two workstations are available for continuous operation; wherein a slab is arranged at each workstation so that its primary plane lies at an angle of −10° to −20° with respect to the vertical plane; each of the workstations being used for loading, flame-cutting and unloading a slab to be cut; and the two workstations being each used to flame-cut slabs in alternating order.

3. The oxycutting procedure in accordance with claim 2, characterized in that a first of the workstations is used to load the slab to be cut and a second of the workstations is used to unload the cut slab, the procedure including a third workstation between the first and second workstations in order to flame-cut the slab in its cutting position of −10° to −20° from the vertical plane; the procedure including loading the slab to be cut onto the first loading workstation, moving the slab to the third workstation, where it is subjected to the oxycutting process, and then moving the cut slab to the second, unloading workstation, where the cut slab is unloaded.

4. The oxycutting procedure in accordance claim 1, characterized in that the slab is slit during the oxycutting.

5. The oxycutting procedure in accordance with claim 1, characterized in that the slab is slit during the relative movement between the slab and the oxycutting torch.

6. The oxycutting procedure in accordance with claim 3, characterized in that the slab is stopped at the third workstation so that the relative movement between the slab and the oxycutting torch can be used to slit the slab.

7. The oxycutting procedure in accordance with claim 1, characterized in that the slabs are loaded in a continuous sequence in order to be carried past the oxycutting torch and are then slit or cut based on the direction of the relative movement between the slab and the oxycutting torch.

8. A device for cutting slabs using an oxycutting torch; the device comprising a frame which receives a slab to be cut: said oxycutting torch and a deburring device: said oxycutting torch and deburring device being positioned on opposite sides of said frame such that the slab, when received on the frame, is between said oxycutting torch and deburring device; said frame being movable between a first position for receiving the slab and a second position in which the slab's primary plane lies at an angle of −10° to −20° with respect to a vertical plane for cutting of the slab.

9. The device in accordance with claim 8, characterized in that the frame for holding a slab includes rollers placed in bracketed pairs so as to accommodate and hold the slab to be cut on its edge at an angle of −10° to −20° and to form an oblique base plane.

10. The device in accordance with claim 9, characterized by at least one pair of guides that are capable of moving in unison along and atop the frame's oblique base plane in order to hold the slab, each pair of guides accommodating at least one oxycutting torch and a deburring device for each cutting torch, so that said oxycutting torch and its associated deburring device can be placed at a desired cutting location along the lengthwise extension of the slab to be cut and held by the frame in order to flame-cut the slab at this desired cutting location.

11. The device in accordance with claim 9, characterized in that, for continuous oxycutting of slabs, the following are included in a line: a second frame for holding a slab such that its primary plane lies at this same angle of −10° to −20° with respect to the vertical plane, said second frame for holding a slab and also including rollers placed in bracketed pairs so as to receive and hold the slab to be cut on its edge at an angle of −10° to −20° and to form a second oblique base plane; said at least one pair of guides being capable of moving in unison along and atop the second frame's oblique base plane in order to hold a slab, each pair of guides accommodating at least one oxycutting torch and the deburring device for each cutting torch, so that said oxycutting torch and its associated deburring device can be placed at a desired cutting location along the lengthwise extension of a slab held by the second frame in order to flame-cut the slab at this desired cutting location; said at least one pair of guides being movable along the oblique base plane so as to be mounted atop the second oblique base plane in order to flame-cut a slab that has been loaded onto the second frame used to hold a slab at the desired cutting point.

12. The Device in accordance with claim 11, characterized by third a workstation placed on the production line between the two first and second frames for holding a slab, said third workstation incorporating a series of rollers placed in bracketed pairs so as to receive a slab on its edge at an angle of −10° to −20° with respect to the vertical plane on a third oblique base plane formed by the series of rollers placed in bracketed pairs, said pair of guides being capable of moving in unison along and atop this third oblique base plane, while the rollers among the rollers that receive the slab on its edge are motorized so as to transport the slab from the first frame for holding a slab to the third workstation for flame-cutting the slab and then to transport the cut slab from this third workstation to the second frame for holding a slab in order to unload the cut slab.

13. The device in accordance with any of claim 10, characterized in that the frames for holding a slab can be adjusted so that their oblique base plane is in a horizontal position for loading a slab or unloading a cut slab respectively.

14. The process of claim 1 wherein the workstation includes a deburring device adjacent said frame and on an opposite side of said frame from said cutting torch; said step of placing the slab on the frame comprising positioning the slab to be between the cutting torch and deburring device.

15. The device according to claim 8 wherein said oxycutting torch and deburring device are mounted on opposed guides, said guides being positioned on opposite sides of said frame and extending across said frame from one side thereof to another; said oxycutting torch and deburring device being movable along said guide and said guide being movable relative to said frame in a direction normal to the direction of movement of said torch and deburring device.

16. An oxycutting device for flame-cutting a slab at a workstation; the workstation comprising a frame and at least one oxycutting torch positioned adjacent said frame and being movable relative to said frame; said frame being movable frame between a first position for receiving the slab and a second position in which the slab's primary plane lies at an angle of −10° to −20° with respect to a vertical plane for cutting of the slab.

17. The oxycutting device according to claim 16 wherein said oxycutting torch is mounted on a torch guide which extends across said frame from one side thereof to another; said oxycutting torch being movable along said torch guide and said guide being movable relative to said frame in a direction normal to the direction of movement of said torch.

18. The oxycutting device according to claim 17 and further including a deburring device adjacent said frame on a side of said frame opposite said oxycutting torch; said deburring device being mounted to a deburring guide which extends across said frame from one side thereof to another and is parallel to torch guide; said deburring device being movable along said deburring guide and said deburring guide being movable along said frame in a direction normal to the direction of movement of said deburring device.

* * * * *